June 7, 1949.  H. C. WATERMAN  2,472,736
MOTOR CONTROL

Filed April 21, 1945  2 Sheets-Sheet 1

INVENTOR.
HERBERT C. WATERMAN
BY Cecil F Arens
ATTORNEY

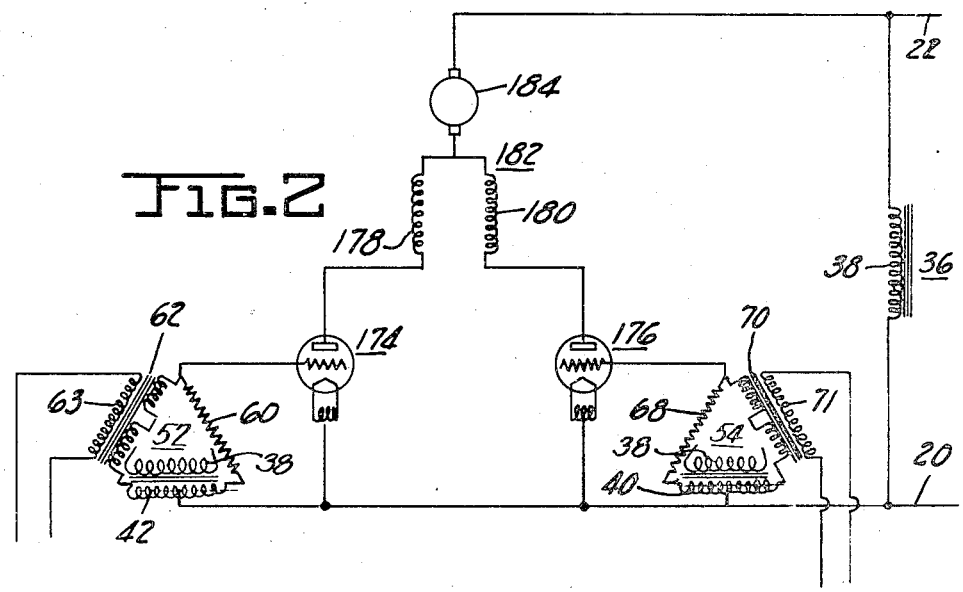
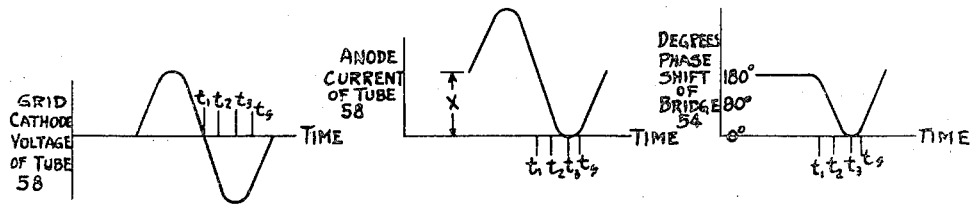
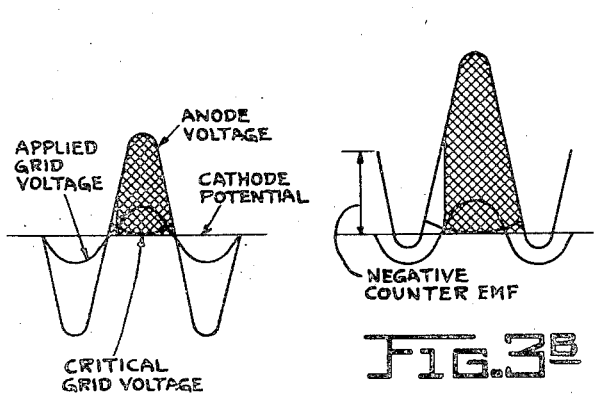

Patented June 7, 1949

2,472,736

UNITED STATES PATENT OFFICE 2,472,736

MOTOR CONTROL

Herbert C. Waterman, South Bend, Ind., assignor to Bendix Aviation Corporation, South Bend, Ind., a corporation of Delaware Application April 21, 1945, Serial No. 589,527

10 Claims. (Cl. 318—506)

This invention relates to systems for controlling the operation of electric motors, and more particularly to systems for controlling the speed of direct current electric motors.

One of the important objects of the invention resides in the provision of a regulating system for direct current motors in which the control devices of the system have no moving parts.

Another very important object of the invention is to provide a speed regulating system for direct current motors which are energized through electronic-tube rectifying means from an alternating current source having a desired voltage and frequency.

A further object of the invention lies in the provision of a speed regulating system for direct current motors which are energized for one direction of rotation through electronic-tube rectifying means from one-half of an alternating current cycle and are energized for an opposite direction of rotation through said electronic-tube rectifying means from the other half of the alternating current cycle.

A still further object of the invention is to provide a speed-regulating system for direct current motors which are energized through electronic-tube rectifying means from an alternating current source whereby one-half of the alternating current cycle may be utilized to accelerate the motors and the other half of the cycle may be used to decelerate the motors.

A yet further object resides in the provision of a speed regulating system which will hold the motor at substantially the desired speed irrespective of positive or negative torque loads which tend to slow down or speed up the motor.

A still more important object is to provide a speed-regulating system for direct current motors which are energized through electronic-tube rectifying means from an alternating current source whereby one-half of the alternating current cycle is utilized to drive a motor in either direction of rotation.

The invention will be best understood from the following description of specific embodiments thereof, when taken together with the accompanying drawings, in which:

Figure 2 is a diagrammatic view of a modified form of the regulating system of the invention; and Figures 3A to 3F show curves illustrating the relationship of grid-cathode voltage to the anode voltage of the tubes in the phase shifting circuit and the influence of this relationship on the firing of the gas tubes.

Figure 1:
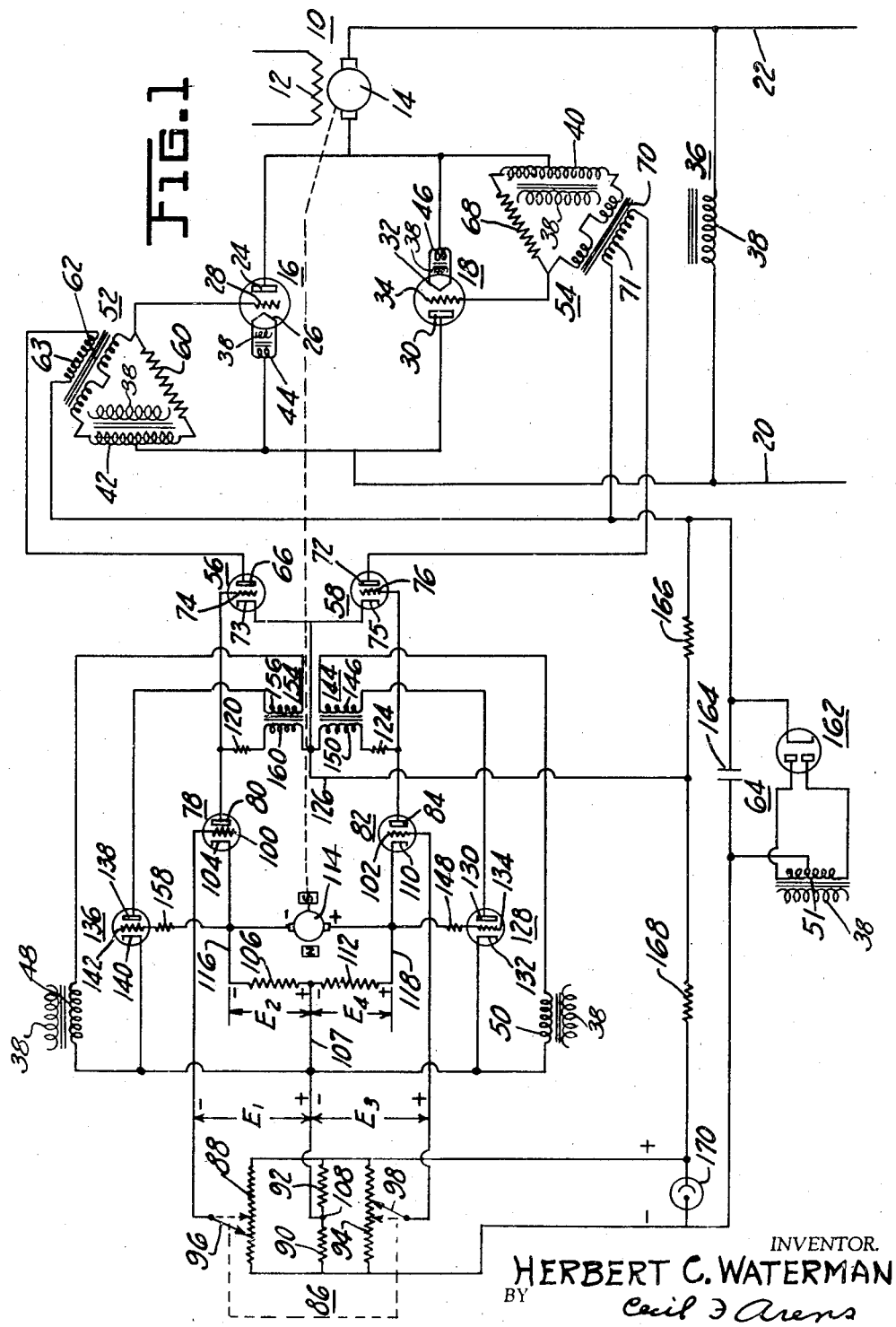
Figure 1 is a diagrammatic representation of devices and circuits exemplifying the regulating system of the invention applied to speed control of a direct current motor.

Referring to the drawings, and particularly to Figure 1 thereof, the direct current motor, the speed of which is to be regulated, is identified by the reference numeral 10. The motor includes a field 12 energized from any suitable source, not shown, and an armature 14 connected in series with gas filled tube 16 for passing current in one direction through the armature and gas filled tube 18 for passing current in the other direction through the armature. The motor armature and each of the gas tubes is in series with an alternating current source having conductors 20 and 22.

The gas filled electronic tubes 16 and 18 may be any of the well-known grid controlled type. Tube 16, which may be termed the clockwise (CW) rectifier tube, comprises an anode or plate 24, an electrically heated cathode 26, and a control grid 28 disposed between the anode and cathode. Tube 18, which may be termed the counterclockwise (CCW) rectifier tube, includes an anode 30, electrically heated cathode 32 and a control grid 34 disposed between the anode and cathode. Tube 16 conducts during CW acceleration of the motor and while driving at a constant velocity against a positive CW torque and tube 18 conducts during CCW acceleration of the motor and while driving at a constant velocity against a positive CCW torque. Tube 16 likewise conducts during CCW deceleration of the motor and while holding at a constant velocity against negative CCW torque and tube 18 conducts during CW deceleration of the motor and while holding at a constant velocity against a negative CW torque.

A transformer 36 has a primary winding 38 connected across the conductors 20 and 22 of the alternating current source. Inductively related to the primary winding 38 are the secondary windings 40, 42, 44, 46, 48, 50 and 51. Of course, it will be recognized that instead of having a single primary winding for all of the secondary windings, a primary winding may be provided for each secondary. The secondaries 44 and 46 supply current to the electrically heated cathodes 26 and 32 of the gas tubes 16 and 18 respectively.

For changing the phase relationship of the grid voltage with respect to the anode voltage each tube 16 and 18 is provided with phase-shifting means which comprises bridge circuits 52 and 54 respectively, connected to the gas tubes 16 and 18 and inductively connected to saturation current amplifiers 56 and 58. The amplifiers 56 and 58 being designated as clockwise (CW) and counterclockwise (CCW) amplifiers to simplify the description and explanation. The bridge circuit 52, which will be termed the clockwise (CW) bridge circuit, includes a resistor 60, a saturable reactor 62 having a saturating winding 63 and the secondary transformer winding 42. The saturable reactor 62 is connected to a direct current source 64 and to anode 66 of the current amplifier 56. The bridge circuit 54, which will be called the counterclockwise (CCW) bridge circuit, includes a resistor 68, a saturable reactor 70 having a saturating winding 71 and the secondary transformer winding 40. The saturable reactor 70 is connected to the direct current source 64 and to anode 72 of the current amplifier 58. The bridge circuit per se associated with each gas tube for accomplishing the phase shift is of conventional design and needs no further explanation to enable those skilled in the art to understand the function and operation thereof. However, in passing, it may be said that the relationship of the components in each of the phase shift bridges are such that the gas tubes grid voltages are normally held 180° out of phase with their anode voltages. Current flowing through the saturating winding of the saturable reactors causes a change in reactor impedance, thus causing a forward shift of grid voltage phase in proportion to the saturating current. This makes it possible for the gas filled tube to be controlled to conduct current over a proportional amount of its anodes' positive half cycle.

In order to control the direct current through the saturating windings of the saturable reactors 62 and 70 to accomplish a desired phase shift to control the firing or conducting of the tubes, means must be provided for changing the bias on grids 74 and 76 respectively of the current amplifier tubes 56 and 58. This means comprises an electrical network including a clockwise (CW) voltage amplifier tube 78, having an anode 80 connected to the grid 74 of the CW current amplifier tube 56 and a counterclockwise (CCW) voltage amplifier tube 82, having an anode 84 connected to the grid 76 of the CCW current amplifier tube 58. A controller 86 having potentiometer windings 88 and 94 and resistors 90 and 92 is connected to the source 64. The controller is provided with sliding arms 96 and 98 connected for simultaneous movement along the windings 88 and 94 in a direction to make one arm become more positive and the other more negative, or vice versa in respect to point 108 which is held by resistors 90 and 92 at the same potential as that existing at the neutral position of the potentiometer windings. The normal position of the arms when the motor is not running is the neutral position, shown in dotted lines. Arm 96 is connected to grid 100 of the CW voltage amplifier tube 78 and arm 98 is connected to grid 102 of the CCW voltage amplifier 82. Cathode 104 of tube 78 is connected through a resistor 106 to a common terminal 107 and to a mid point 108. Cathode 110 of tube 82 is likewise connected through a resistor 112, having the same ohmic value as resistor 106, to the common terminal 107 and thence to the mid point 108. With the potentiometer arms in the position shown in solid lines the voltage output of the controller which is effective in the grid-cathode circuit of tube 78 may be designated as E1, and having the polarity shown; the voltage output of the controller which is effective in the grid-cathode circuit of tube 82 may be designated as E3 and having the polarity shown.

A generator 114, which has a permanent magnet field, is driven by the motor 10 and generates an output voltage in direct proportion to the motor speed. The generator is connected to lines 116 and 118 which respectively connect cathode 104 to the resistor 106 and cathode 110 to the resistor 112. For clockwise rotation of the motor it is assumed that the polarity of the generator will be as designated in the drawings. The generator will develop voltage E2 across the resistor 106 and a voltage E4 across resistor 112. Voltage E2 is the generator output voltage which is effective in the grid-cathode circuit of tube 78 and voltage E4 is the generator output voltage which is effective in the grid-cathode circuit of tube 82. The polarity of the voltages across the resistors will be as shown for clockwise rotation of the motor and with the above assumed polarities of the generator.

To bias the current amplifiers 56 and 58 to plate current cut-off when the controller 86 is in neutral position a pair of resistors 120 and 124 connect the anodes 80 and 84 respectively to line 126 which connects the direct current source 64. Here it will be well to point out that the tube characteristics of tubes 78 and 82 are such that when the controller is in the aforementioned neutral position there is sufficient current through the resistors 120 and 124 to bias the current amplifier tubes 56 and 58 to plate current cut off.

To decelerate the motor the gas rectifier tube which had not been conducting to drive the motor must be caused to conduct until the motor speed has dropped to the desired value, at which time the gas rectifier tube now conducting must cease to conduct and the gas tube which had been conducting during acceleration of the motor must again be caused to conduct enough current to maintain the new motor speed. It should be noted that whenever the motor is rotating, the total voltage existing in the armature circuit is the algebraic sum of the instantaneous alternating line voltage and the direct armature voltage commonly known as the motors' counter-EMF. Whenever a gas rectifier tube is caused to conduct to accelerate the motor or keep it running against a positive torque—which always tends to decrease the motor speed—this armature circuit voltage during the half cycle which the accelerating tube can conduct, is equal to the alternating voltage minus the direct counter-EMF. However, if a gas rectifier tube is caused to conduct current to decelerate the motor or hold its speed down against a negative torque—which always tends to increase the motor speed—this armature circuit voltage during the half cycle in which the decelerating tube can conduct is equal to the alternating voltage plus the direct counter-EMF. This increased voltage makes the decelerating currents higher than the normal accelerating current for equal firing time. To eliminate this undesirable condition means has been introduced into the system or network for preventing full grid voltage phase shift of the gas tube which is conducting during deceleration of the motor. This means comprises a clockwise (CW) deceleration tube 128 having an anode 130, a cathode 132 and a grid 134, and a counterclockwise (CCW) deceleration tube 136 having an anode 138, a cathode 140 and a grid 142; the former tube is connected to the system to introduce an alternating voltage bias on the CCW current amplifier 58 when the motor is rotating CW and the latter tube is connected to the system to introduce an alternating voltage bias on the CW current amplifier 56 when the motor is rotating CCW. A clockwise (CW) deceleration transformer 144 has a winding 146 connected in series with the secondary winding 50 and the anode circuit of the CW deceleration tube 128. The cathode 132 and one end of the secondary winding 50 are connected to the common terminal 107, which is connected to the grid 134 through resistors 112 and 148. Resistor 112 introduces E4 as the grid-cathode voltage of tube 128. Since this voltage varies in polarity and magnitude as the speed and direction of generator rotation is changed, and since it is desired that when E4 causes grid 134 to become positive in respect to cathode 132 the grid 134 shall become only slightly positive, resistor 148 is used. This resistor introduces a voltage drop in the grid-cathode circuit in opposition to but never greater than E4 whenever current tends to flow from cathode to grid in tube 128. The CW transformer 144 has a secondary winding 150 one end of which is connected to the resistor 124 and the other end of which is connected to the line 126 which is connected to the direct current source and to cathodes 73 and 75 of tubes 56 and 58 respectively. A counter-clockwise (CCW) deceleration transformer 154 has a winding 156 connected in series with the secondary winding 48 and the anode circuit of the CCW deceleration tube 136. The cathode 140 and one end of the secondary winding 48 are connected to the common terminal 107, which is connected to the grid 142 through resistors 106 and 158. Resistor 106 introduces E2 as the grid-cathode voltage of tube 136. Since this voltage varies in polarity and magnitude as the speed and direction of generator rotation is changed, and since it is desired that when E2 causes grid 142 to become positive in respect to cathode 140 the grid 142 shall become only slightly positive, resistor 158 is used. This resistor introduces a voltage drop in the grid-cathode circuit in opposition to but never greater than E2 whenever current tends to flow from cathode to grid in tube 136. The CCW transformer 154 has a secondary winding 160, one end of which is connected to the resistor 120 and the other end of which is connected to the line 126.

The direct current source 64 comprises a full wave rectifier tube 162 connected to the secondary transformer winding 51. A filter capacitor 164 is used to smooth the pulsating D. C. voltage appearing across rectifier tube 162 and the midpoint of the secondary winding 51. Voltage dividing resistors 166 and 168 are connected between the rectifier 162 and the network to supply the required direct current voltages thereto. A gaseous voltage regulator tube 170 is connected across the direct current leads to the controller 86 to keep the voltages E1 and E3 substantially uniform for a given position of the controller.

For situations in which it is desired to utilize only one-half the alternating current cycle to drive a motor in either direction, the modification of Figure 2 will be found to be quite satisfactory. This system is identical to that of Figure 1 with the exception of the motor 182 and the gas filled tubes 174 and 176. The tubes 174 and 176 are connected in the alternating current source to conduct on the same half cycle but at different times determined by the position of the controller. The tubes 174 and 176 are connected in series with field windings 178 and 180 respectively, of a series motor 182 having an armature 184. The windings 178 and 180 are wound in opposite directions in order to obtain clockwise or counter-clockwise rotation of the motor. It will be noted that all other connections are the same as shown in Figure 1.

The operation of the system for controlling the speed of the motor is as follows: With the controller of Figure 1 in neutral position, shown in dotted lines, and the motor at rest, E1, E2, E3 and E4 are zero. Under these conditions the CW and CCW acceleration amplifiers 78 and 82 respectively draw sufficient current through the resistors 120 and 124 to bias the CW and CCW current amplifiers 56 and 58 to plate current cut off.

Assuming a condition where the controller has been displaced so that its arms are in the position shown in solid lines for CW rotation of the motor, the CW acceleration voltage amplifier 78 will have its grid made more negative and the CCW voltage amplifier 82 will have its grid made more positive with respect to point 108. The CCW voltage amplifier 82 the grid of which has been driven more positive by the control voltage E3 simply draws more current, thereby increasing the bias on the CCW current amplifier 58. Since the bias on this current amplifier was already causing plate current cut off, current through the saturating winding 71 of the saturable reactor 70 will remain zero. The CW voltage amplifier 78 the grid of which has been driven more negative by the control voltage E1 draws less current, thereby reducing the bias on the CW current amplifier 56. This decrease in the bias on the tube 56 causes it to draw more current through the saturating winding 63 of the saturable reactor 62. The passage of current through the saturable reactor, which is located in the bridge circuit, changes the impedance in that part of the bridge circuit. The change in reactor impedance, which is normally such as to cause the voltage on the grid to be 180° out of phase with the anode voltage, causes the grid voltage phase to be shifted with respect to the anode voltage in proportion to the saturating current to thereby fire the CW gas tube 16. The tube now conducts current over a predetermined portion of its positive half cycle and causes the motor 10 to accelerate in a CW direction. Here it will be well to point out that if the motor were running in a CCW direction when the CW gas tube 16 was fired the motor would decelerate since there would be a tendency to rotate the motor in a direction opposite to its direction of rotation. Therefore, it can be said that the CW gas tube 16 conducts current when accelerating the motor CW or when decelerating the motor from CCW rotation. Likewise, CCW gas tube 18 is fired when it is desired to accelerate the motor in a CCW direction or decelerate the motor from a CW direction.

After the motor has been brought up to the required speed the output voltage E2 and E4 of the generator, which is directly proportional to the speed of the motor, acts to cancel E1 and E3, tending to return the tube voltages on the tubes 78 and 82 to the same conditions that existed when the controller was in neutral. As soon as the motor is accelerated clockwise to a speed where the controller voltages E1 and E3 are almost canceled by the generator voltages E2 and E4, the average current through the CW gas tube 16 begins to decrease and the action stabilizes with just enough current flowing to maintain the desired motor speed. Since E1 and E2, in the range of controllable motor speeds, are many times greater than the voltage difference E1 minus E2 necessary to completely change the conduction time of tube 16 from minimum to maximum, the motor speed obtained will be that speed at which the motor is rotating just fast enough for the generator voltages to substantially cancel the controller output voltages.

Should it be desired to decelerate the motor from CW rotation to some slower speed in the same direction, the controller displacement is changed so that the wiper arms 96 and 98 will occupy some position intermediate the solid line pisition and dotted line position of the arms. This change in controller displacement reduces the controller voltage E1 and E3, and since the motor speed is not instantaneously reduced the output voltages E2 and E4 of the generator remain temporarily unaffected. At this time the generator voltages E2 and E4 become greater than the control voltages E1 and E3. This reverses the polarities of grids 100 and 102. Since it has been assumed that the motor is running CW, this change in controller displacement will cause the grid of the CW acceleration amplifier 78 to be biased more positive to thereby cut off the CW gas tube. The grid of the CCW acceleration amplifier 82 will be biased more negative to thereby cause the CCW gas tube 18 to fire to decelerate the motor.

The phase shift during deceleration is controlled to prevent greater currents flowing through the motor armature during deceleration than flow during acceleration. Figures 3A and 3B exhibit this unbalanced condition, 3A representing conditions existing when the motor is being accelerated from standstill and 3B conditions when decelerating from a high speed. Anode voltage, critical grid voltage, and an applied grid voltage in phase with the anode voltage are shown—the critical grid voltage being that grid voltage above which the tube will fire. The plotted value of the critical grid voltage may be effectively shifted more positive or more negative by placing a direct voltage (not shown) in series with the grid, in any conventional manner, in order to adapt specific tubes to this circuit.

Control of the phase shift during deceleration is accomplished by the CW deceleration tube 128 which causes half cycle current to flow in winding 144 each time secondary 50 causes anode 130 to be positive with respect to cathode 132, thus inducing an alternating voltage, essentially as shown in Figure 3C, in winding 150. During CW deceleration this alternating voltage is the only voltage in the grid-cathode circuit of tube 58. This voltage causes anode current flow in tube 58 as shown in Figure 3D, and since current value X is chosen to be sufficient to fully saturate reactor 70, the phase of the applied grid voltage of tube 18 will vary as shown in Figure 3E.

Figure 3F shows the effect of combining the data of Figure 3E with the anode voltage and critical grid voltage data of Figure 3B. Grid voltage plots 1, 2, 3 and f are those which would exist if the instantaneous grid voltages occurring at $t_1$, $t_2$, $t_3$ and $t_f$ were extended in their instantaneous phase relationships for slightly more than a negative half cycle.

At $t_1$ the applied grid voltage is less than the critical grid voltage thus preventing firing. At $t_2$, firing is still prevented since the applied grid voltage has shifted to phase position 2. Likewise, by shifting to phase position 3 firing is prevented at $t_3$. Position 3 represents maximum shift in that direction, the shift begins to move back toward position 1 and firing will occur at some position $t_f$, where the applied grid voltage has finally become more positive than the critical grid voltage.

When the shift from position 1 to position 3 represents 180° shift, maximum delay of firing time is obtained. It is evident that for less delay of firing time, smaller values of the alternating bias voltage shown in Figure 3C will result in less maximum phase shift between position 1 and position 3 respectively, and thus any intermediate value of firing time delay may be obtained to match acceleration and deceleration currents.

The above explanation was made for CW rotation of the motor but it will be remembered that the theory and operation of the system will be the same for CCW rotation.

It is to be understood that the apparatus and connections shown in the drawings are merely illustrative and are not to be taken in a limiting sense since alterations and modifications will occur to those skilled in the art without departing from the spirit of the invention or the scope of the appended claims.

What I claim as new and desire to secure by Letters Patent of the United States, is:

1. The combination with a direct current motor, of a pair of grid controlled gas tube rectifiers adapted to be connected to a source of alternating current, each of said tubes being connected in series with the motor and in parallel with respect to each other for supplying unidirectional current to the motor, phase shifting means adapted to be connected to the alternating current source, said phase shifting means connected to each of the rectifier tubes for changing the phase relationship of the grid voltage with respect to the anode voltage to fire one or the other of the gas tubes depending on the desired direction of rotation of the motor, and means including a controller for selecting a voltage which determines the direction of rotation of said motor and for causing the phase shifting means to fire only the gas tube corresponding to the selected direction of rotation of the motor, said last-named means also including a generator with an output proportional to motor speed and connected in opposition to the selected voltage for causing the other gas tube to fire to tend to rotate the motor in the opposite direction when the controller is displaced to a position to decelerate the motor.

2. The combination with a direct current motor, of grid controlled gas tube rectifiers adapted to be connected to a source of alternating current, said gas tube rectifiers being connected to the motor for supplying unidirectional current thereto, phase shifting means adapted to be connected to the alternating current source for changing the phase relationship of the grid voltage with respect to the anode voltage to fire one or the other of the gas tubes depending on the desired direction of rotation of the motor, means comprising a controller for selecting the direction of rotation of said motor and for causing the phase shifting means to fire the gas tube corresponding to the selected direction of rotation of the motor, said last-named means also including means responsive to the rotation of said motor for causing the other gas tube to fire to tend to rotate the motor in the opposite direction when the controller is displaced to a position to decelerate the motor, and means including a device sensitive only to motor direction, for controlling the phase shift and therefore the current of said other gas tube during deceleration of the motor.

3. The combination with a direct current motor provided with an armature circuit, of a pair of grid controlled electric discharge tubes adapted to be connected to a source of alternating current and each having an anode and cathode, and connected to the armature circuit for supplying a unidirectional current thereto, phase shifting means connected to the grids to vary the relationship of the grid and anode voltages to thereby control the firing of the tubes in accordance with the direction and speed required of the motor, means comprising a grid controlled vacuum tube associated with each of the discharge tubes and a controller for varying the grid potential of one of the vacuum tubes to cause its associated discharge tube to fire when acceleration of the motor in a predetermined direction is desired and for varying the grid potential of the other vacuum tube to cause its associated discharge tube to fire when acceleration of the motor in the other direction is desired, and a generator driven by the motor and having its output potential connected in opposition to the grid potentials, as determined by the controller position, so that when the controller is displaced to decelerate the motor from the said one or the other directions the grid potential of the vacuum tube corresponding to the selected direction of deceleration is varied in a manner to cause its associated discharge tube to fire.

4. The combination with a direct current motor provided with an armature circuit, of a pair of grid controlled electric discharge tubes adapted to be connected to a source of alternating current and each having an anode and cathode, and connected to the armature circuit for supplying a unidirectional current thereto, phase shifting means connected to the grids to vary the relationship of the grid and anode voltages to thereby control the firing of the tubes in accordance with the direction and speed required of the motor, means comprising a grid controlled vacuum tube associated with each of the discharge tubes and a controller for varying the grid potential of one of the vacuum tubes to cause its associated discharge tube to fire when acceleration of the motor in a predetermined direction is desired and for varying the grid potential of the other vacuum tube to cause its associated discharge tube to fire when acceleration of the motor in the other direction is desired, a generator driven by the motor and having its output potential connected in opposition to the grid potentials, as determined by the controller position, so that when the controller is displaced to decelerate the motor from the said one or the other directions the grid potential of the vacuum tube corresponding to the selected direction of deceleration is varied in a manner to cause its associated discharge tube to fire, and means adapted to be inductively connected to the alternating current source and including a device associated with each gas tube and connected to the generator output potential and sensitive only to motor direction so that when deceleration of the motor is desired the device associated with the gas tube that fired during acceleration tends to prevent that tube from firing and the device associated with the gas tube that will be fired during deceleration tends to cause that tube to fire over a portion only of the time during which the anode is positive with respect to the cathode whereby the current through the armature circuit is controlled irrespective of the controller position.

5. In a system for controlling the operation of an electric motor provided with an armature circuit, a pair of grid controlled gas filled current rectifiers adapted to be connected to a source of alternating current and having an anode and cathode, and connected to the armature circuit, each of said rectifiers being constructed and arranged with respect to the alternating current source to be fired on the same half cycle of alternating current but at different times for both directions of rotation of the motor, phase shifting means adapted to be connected to the alternating current source for changing the phase relationship of the grid voltage with respect to the anode voltage to fire one or the other of the rectifiers depending upon the desired direction of rotation of the motor, said phase shifting means including a phase shift bridge for each rectifier and a saturable reactor in each bridge, a direct current source for the saturable reactors, grid controlled current amplifiers for controlling the direct current to the saturable reactors, and means including a potentiometer for selecting the direction of rotation of said motor and for varying the potential of the grid of one of the current amplifiers corresponding to the selected direction of rotation of the motor for firing one only of the rectifiers, said last-named means also including a generator driven by said motor and having its output potential connected in opposition to the potentiometer for varying the grid potential of the other current amplifier for firing said other rectifier to tend to drive the motor in the opposite direction when the potentiometer has been deflected to a position to decelerate the motor.

6. In a system for controlling the operation of an electric motor provided with an armature circuit, a pair of grid controlled gas filled current rectifiers adapted to be connected to an alternating current source and having an anode and cathode, and connected to the armature circuit, each of said rectifiers being constructed and arranged with respect to the alternating current source to be fired on the same half cycle of alternating current for both directions of rotation of the motor, phase shifting means adapted to be connected to the alternating current source for changing the phase relationship of the grid voltage with respect to the anode voltage to fire one or the other of the rectifiers depending upon the desired direction of rotation of the motor, said phase shifting means including a phase shift bridge for each rectifier and a saturable reactor in each bridge, a direct current source for the saturable reactors, grid controlled current amplifiers for controlling the direct current to the saturable reactors, means including a potentiometer for selecting the direction of rotation of said motor and for varying the potential of the grid of one of the current amplifiers corresponding to the selected direction of rotation of the motor for firing one of the rectifiers, said last-named means also including a generator driven by said motor and having its output potential connected in opposition to the potentiometer for varying the grid potential of the other current amplifier for firing said other rectifier to tend to drive the motor in the opposite diection when the potentiometer has been deflected to a position to decelerate the motor, and means adapted to be inductively connected to said alternating current source and including a device sensitive only to motor direction for maintaining an alternating bias on the grid of the said other current amplifier for controlling the phase shift and consequently the firing time of said other rectifier during deceleration of the motor.

7. In a system for controlling the operation of an electric motor provided with an armature circuit, a pair of grid controlled gas filled current rectifiers adapted to be connected to an alternating current source and having an anode and cathode, and connected to the armature circuit, each of said rectifiers being constructed and arranged with respect to the alternating current source to be fired on the same half cycle of alternating current for both directions of rotation of the motor, phase shifting means adapted to be connected to the alternating current source for changing the phase relationship of the grid voltage with respect to the anode voltage to fire one or the other of the rectifiers depending upon the desired direction of rotation of the motor, said phase shifting means including a phase shift bridge for each rectifier and a saturable reactor in each bridge, a direct current source for the saturable reactors, grid controlled current amplifiers for controlling the direct current to the saturable reactors, means including a potentiometer for selecting the direction of rotation of said motor and for varying the potential of the grid of one of the current amplifiers corresponding to the selected direction of rotation of the motor for firing one of the rectifiers, said last-named means also including a generator driven by said motor and having its output potential connected in opposition to the potentiometer for varying the grid potential of the other current amplifier for firing said other rectifier to tend to drive the motor in the opposite direction when the potentiometer has been deflected to a position to decelerate the motor, and means adapted to be inductively connected to said alternating current source and comprising a vacuum tube having a grid with a resistor in series therewith, an anode and cathode, a transformer having its primary winding connected in series with the anode and its secondary winding connected in series with the grid of said other amplifier, said resistor being constructed and arranged to keep a substantially constant bias on the grid of the vacuum tube to thereby maintain a constant current in the transformer windings for maintaining an alternating bias on the grid of said other current amplifier for controlling the phase shift and consequently the firing time of said other rectifier during deceleration of the motor.

8. In a system for controlling the operation of an electric motor provided with an armature circuit, a pair of grid controlled gas tube rectifiers adapted to be connected to an alternating current source and including an anode and cathode, and connected to the motor for supplying a unidirectional current thereto, each of said rectifiers being constructed and arranged with respect to the alternating current source so that one of said rectifiers will fire on one half of the alternating current cycle for one direction of rotation and the other rectifier will fire on the other half of the alternating current cycle for an opposite direction of rotation of the motor, phase shifting means adapted to be connected to the alternating current source for changing the phase relationship of the grid voltage with respect to the anode voltage to fire one or the other of the gas tubes depending on the desired rotation of the motor, and means including a controller for selecting the direction of rotation of said motor and for causing the phase shifting means to fire one of the gas tubes corresponding to the selected direction of rotation of the motor, said last-named means also including means responsive to the rotation of said motor for causing the other gas tube to fire to tend to rotate the motor in the opposite direction when the controller is displaced to a position to decelerate the motor.

9. In a system for controlling the operation of an electric motor provided with an armature circuit; grid controlled current-rectifying gas tubes adapted to be connected to an alternating current source and arranged in the armature circuit; said tubes being arranged in the circuit so that one of the tubes fires during one-half of the alternating current cycle for accelerating the motor and the other tube fires during the other half of the alternating current cycle for decelerating the motor; phase shifting means adapted to be connected to the alternating current source, said phase shifting means connected to the grids of the rectifying tubes for changing the phase voltage of said grids to cause one or the other of the tubes to fire; means comprising a normally neutral positioned potentiometer connected to a direct current source and a generator driven by the motor and having its output voltage connected in opposition to the variable voltage of the potentiometer, means responsive to deflection of the potentiometer away from neutral for firing one of the rectifying tubes to accelerate the motor, and means responsive to deflection of the potentiometer back toward neutral for firing the other rectifying tube to decelerate the motor.

10. In a system for controlling the operation of an electric motor provided with an armature circuit; grid controlled current-rectifying gas tubes adapted to be connected to an alternating current source and arranged in the armature circuit; said tubes being arranged in the circuit so that one of the tubes fires during one-half of the alternating current cycle for accelerating the motor and the other tube fires during the other half of the alternating current cycle for decelerating the motor; phase shifting means adapted to be connected to the alternating current source, said phase shifting means connected to the grids of the rectifying tubes for changing the phase voltage of said grids to cause one or the other of the tubes to fire; means comprising a normally neutral positioned potentiometer connected to a direct current source and a generator driven by the motor and having its output voltage connected in opposition to the variable voltage of the potentiometer, means responsive to deflection of the potentiometer away from neutral for firing one of the rectifying tubes to accelerate the motor, means responsive to deflection of the potentiometer back toward neutral for firing the other rectifying tube to decelerate the motor; and means for influencing said grids of said rectifying tubes for obtaining maximum desired phase shift of the tube fired during acceleration of the motor and limited phase shift of the tube fired during deceleration of the motor.

HERBERT C. WATERMAN.

REFERENCES CITED

The following references are of record in the file of this patent:

UNITED STATES PATENTS

| Number | Name | Date |
|---|---|---|
| 1,942,587 | Whitman | Jan. 9, 1934 |
| 1,944,754 | Quarles | Jan. 23, 1934 |
| 2,105,598 | Hubbard | Jan. 18, 1938 |
| 2,131,759 | Satterlee | Oct. 4, 1938 |
| 2,163,632 | Satterlee | June 27, 1939 |
| 2,175,009 | Anderson | Oct. 3, 1939 |
| 2,325,092 | Andrews | July 27, 1943 |

Certificate of Correction

Patent No. 2,472,736  June 7, 1949

HERBERT C. WATERMAN

It is hereby certified that errors appear in the printed specification of the above numbered patent requiring correction as follows:

Column 6, line 60, for "conroller was in neural" read *controller was in neutral*; column 10, line 61, for "diection" read *direction*;

and that the said Letters Patent should be read with these corrections therein that the same may conform to the record of the case in the Patent Office.

Signed and sealed this 20th day of December, A. D. 1949.

[SEAL]

THOMAS F. MURPHY,
*Assistant Commissioner of Patents.*